United States Patent
Hanson

(10) Patent No.: US 7,114,775 B2
(45) Date of Patent: Oct. 3, 2006

(54) SACROILIAC JOINT SUPPORT MECHANISM FOR USE WITH A GOLF VEHICLE

(76) Inventor: Scott Hanson, P.O. Box 3433, Ketchum, ID (US) 83340

( * ) Notice: Subject to any disclaimer, the term of this patent is extended or adjusted under 35 U.S.C. 154(b) by 0 days.

(21) Appl. No.: 10/937,052

(22) Filed: Sep. 9, 2004

(65) Prior Publication Data

US 2006/0049676 A1 Mar. 9, 2006

(51) Int. Cl.
*A47C 7/02* (2006.01)
(52) U.S. Cl. .................... 297/230.13; 297/230.14; 297/230.12
(58) Field of Classification Search ............ 297/230.1, 297/230.12, 230.13, 230.11, 228.12, 228.13, 297/228.11, 228.1, 397, 352, 411.46, 452.57, 297/230.14; 5/118, 653, 655.9, 636, 648, 5/657.5, 658
See application file for complete search history.

(56) References Cited

U.S. PATENT DOCUMENTS

| | | | | | |
|---|---|---|---|---|---|
| 1,734,180 | A | * | 11/1929 | Olson | 297/230.14 |
| 2,434,007 | A | * | 1/1948 | O'Dea | 297/230.14 |
| 3,501,197 | A | * | 3/1970 | Burton | 297/232 |
| 4,471,993 | A | * | 9/1984 | Watson | 297/284.5 |
| 4,930,591 | A | * | 6/1990 | Lanius et al. | 180/65.1 |
| 5,320,408 | A | * | 6/1994 | Wansley et al. | 297/230.14 |
| 6,279,993 | B1 | * | 8/2001 | Berthiaume | 297/219.1 |

FOREIGN PATENT DOCUMENTS

EP 0469620 * 5/1992

* cited by examiner

*Primary Examiner*—Milton Nelson, Jr.
(74) *Attorney, Agent, or Firm*—James E. Parris

(57) ABSTRACT

A sacroiliac joint support mechanism for installing to a seat of a golf vehicle, having a sacroiliac joint support cushion for abutting to the posterior wall region of the sacroiliac joint, angling elements for creating an angle of support and an attachment elements for fixedly installing the sacroiliac joint support mechanism to an open span between a golf vehicle seat bottom and a golf vehicle seat back.

9 Claims, 5 Drawing Sheets

SACROILIAC JOINT SUPPORT MECHANISM FOR USE WITH A GOLF VEHICLE

FIELD OF INVENTION

The current invention relates to a means of supporting the sacroiliac joint of the pelvic region when an individual is seated in a golf vehicle. More specifically, the invention is a sacroiliac joint support mechanism for inserting to an open span between a seat bottom and seat back of a golf vehicle seat, wherein the support mechanism comprises a supportive cushion having a desirable angle and projection for supporting the posterior wall region of the sacroiliac joint.

BACKGROUND OF INVENTION

The sacroiliac joint is a firm, small joint that lies at the junction of the spine and the pelvis. The joint comprises sacroiliac ligaments for connecting the sacrum with the ilium, where the sacrum comprises five fused vertebrae forming the posterior wall of the pelvis, and the ilium is the broad upper portion of pelvis. The sacroiliac joint does not move much, but it is critical to transferring loads between the upper body and the lower body.

Many golfers suffer from sacroiliac joint pain brought on from swinging a golf club and riding in golf vehicles. A golfer relies on the sacroiliac joint to execute a proper golf swing, where the golf swing comprises transferring forces between the legs, hips and upper body. The sacroiliac joint is a key element in transmitting these forces and the joint becomes inflamed and sore over repeated swings.

A golf vehicle seat typically has a seat bottom and a seat backing where an open span exists between the seat bottom and seat back. The open span leaves the posterior wall region of the sacroiliac joint unsupported and prone to sacroiliac joint aggravation when driving or riding in the golf vehicle, especially across rough terrain.

What is needed is a sacroiliac joint support mechanism for inserting to an open span between a seat bottom and a seat back of a golf vehicle for supporting sacroiliac joints of golfers riding in golf vehicles.

DETAILED DESCRIPTION OF THE DRAWINGS

Figure 1:
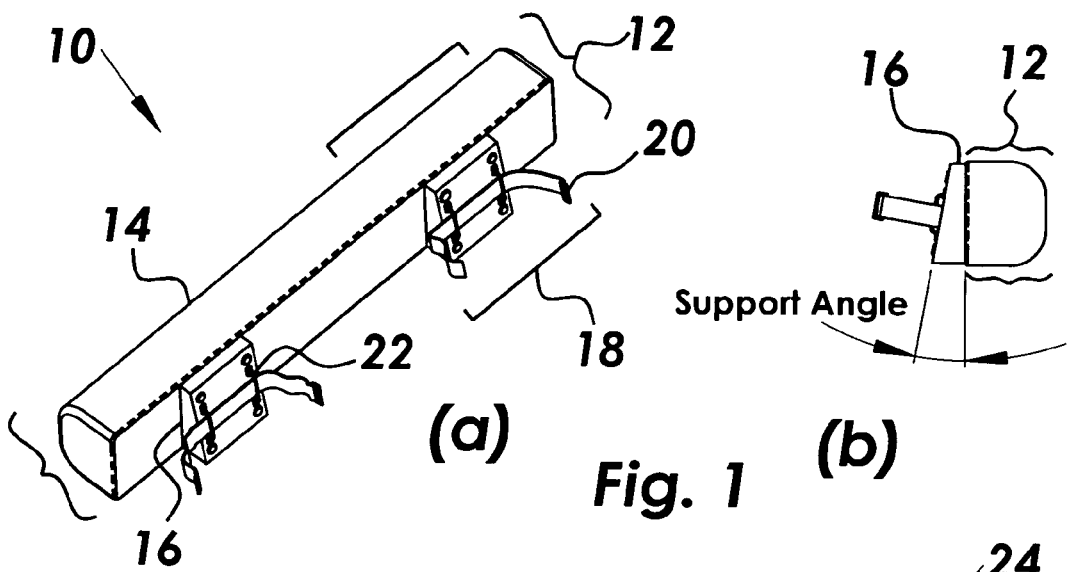
FIGS. 1(a) and 1(b) depict one embodiment of a sacroiliac joint support mechanism for use with a golf vehicle.

Shown in the drawings for the purpose of illustration and discussion, the current invention provides support for the sacroiliac joint of golfers seated in golf vehicles. Depicted in FIGS. 1(a) and 1(b) is one embodiment of a sacroiliac joint support mechanism 10 for use with a golf vehicle, where shown in FIG. 1(a) is a rear perspective view of the sacroiliac joint support mechanism 10. Depicted in curved brackets is a sacroiliac joint supportive means comprising a support cushion 12 for abutting the posterior wall region of the sacroiliac joint, about three to six inches in thickness, three to six inches in height and thirty to forty inches in length, where the length is suitable to approximately match the seat width across a golf vehicle, the height is less than a span between a golf vehicle seat bottom and seat back, and the thickness projects the sacroiliac joint support cushion 12 up to three inches a beyond a golf vehicle seat back 28 cushion front surface. The sacroiliac joint support cushion 12 further comprises a durable soft cover 14 for holding a supportive flexible foam material (not shown) having a predetermined elasticity, and for holding a backing board (not shown). The backing board (not shown) is for fixedly securing the durable soft cover 14 thereto and for fixedly holding an attachment means 18 (shown in curved brackets). An angling means 16, depicted as an angled block of wood, plastic or metal, is configured for desirably positioning the support cushion to a predetermined angle of support and predetermined projection within an open span of a golf vehicle seat, where the predetermined angle is up to thirty degrees from a horizontal plane and the predetermined projection is up to three inches beyond the seat back front surface. The depicted angling means 16 is but one example, where other angling means 16 may comprise a pivotable assembly for enabling individualized angling according to a golfer's preference. The angling means 16 are fixedly attached to the backing board 38 within the durable soft cover 14 using screws, glue, welding or molding methods, and positioned symmetrically about a midpoint of the longitudinal length of the backing board.

Shown in curved brackets and discussed in detail below, are attachment means 18 for affixing the angling means 16 to a seat back frame, where depicted are a pair of attachment straps 20 each fitted through a pair of attachment loops 22 fixedly attached to the angling means 16. The depicted attachment means 18 is but one example, where other attachment means 18 may comprise use of hook and pile straps, buckling straps, cinching straps, clamping or gripping means to name a few. It should be obvious to one skilled in the art that the attachment means can be made suitable for attaching to various seat frame shapes such as square, rectangle, round or polygonal to name a few.

FIG. 1(b) depicts a side plan view of the sacroiliac joint support mechanism 10, having the sacroiliac joint support cushion 12. The durable soft cover 14 is depicted having a stitching means 40 of attachment, where it is understood the same results may be achieved using adhesives or molding means. Inverting the depicted sacroiliac support mechanism 10 provides an inverted angle of support of the sacroiliac support if desired.

Figure 2:
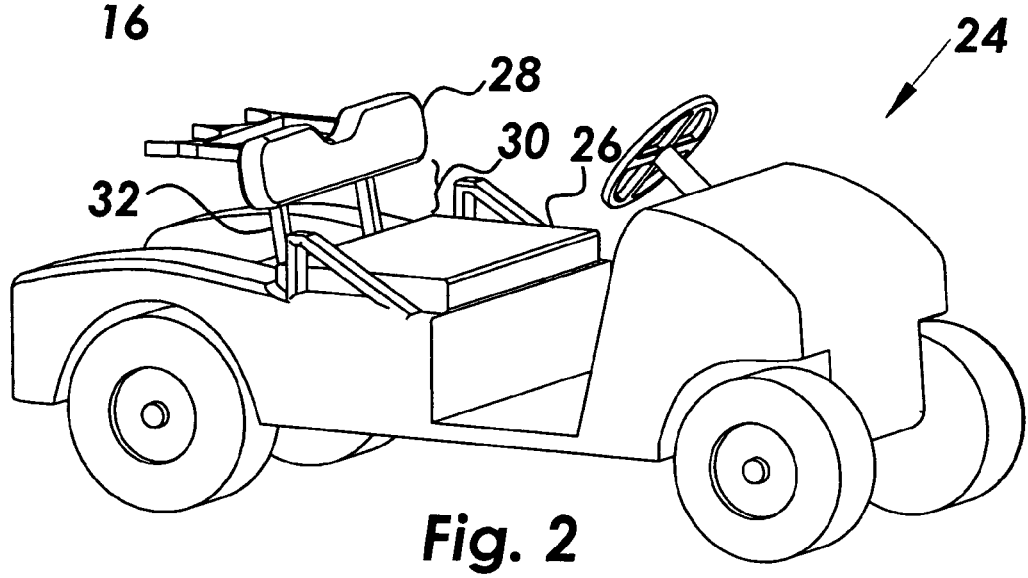
FIG. 2 depicts a perspective view of a typical golf vehicle.

FIG. 2 depicts a front perspective view of a typical golf vehicle 24 having a seat base 26 a seat back 28 and an open span 30 there between, where the seat back 28 is supported by a seat back frame 32. The seat back frame 32 comprises extruded metal or plastic bars that project vertically from the golf vehicle chassis 36 according to a predetermined angle commonly found with golf vehicles 22. The attachment means 18 of the sacroiliac support mechanism 10 attaches to the seat back frame 32.

Figure 3:
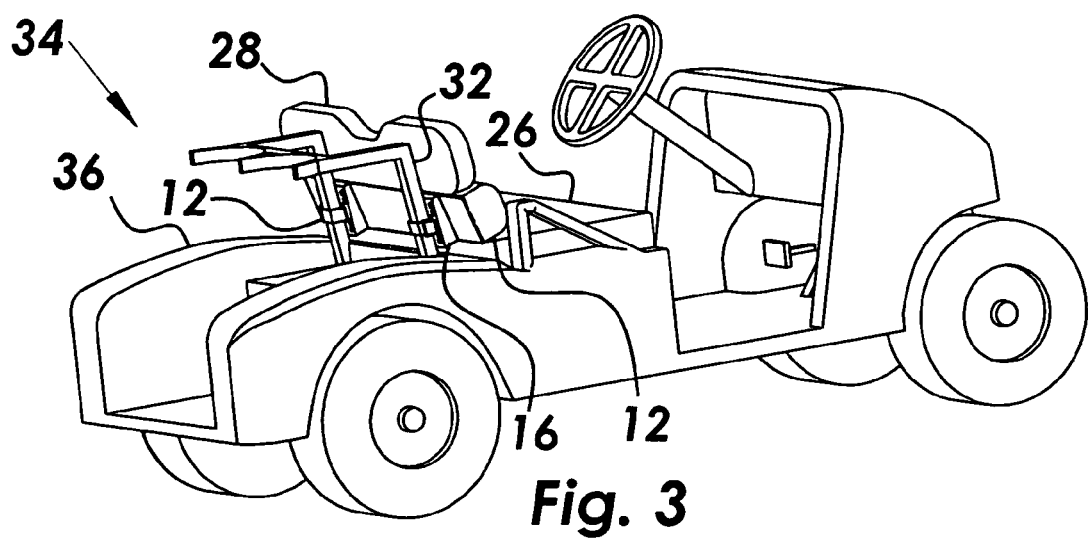
FIG. 3 depicts a rear perspective view of a sacroiliac support mechanism installed to a golf vehicle.

FIG. 3 depicts a rear perspective view of an installed sacroiliac support mechanism 34. As shown the sacroiliac support mechanism 10 is positioned within the open span 30 between the seat base 26 and seat back 28 of the golf vehicle 24. Attachment straps 20 are tensioned about the seat back frame 32 and secured using hook and pile strapping means, where it is understood other suitable securing means may also be used as described above. As depicted, angling means 16 abut the seat back frame 32 to position the support cushion 12 to a predetermined angle relative to the seat base 26 and seat back 28.

Figure 4:
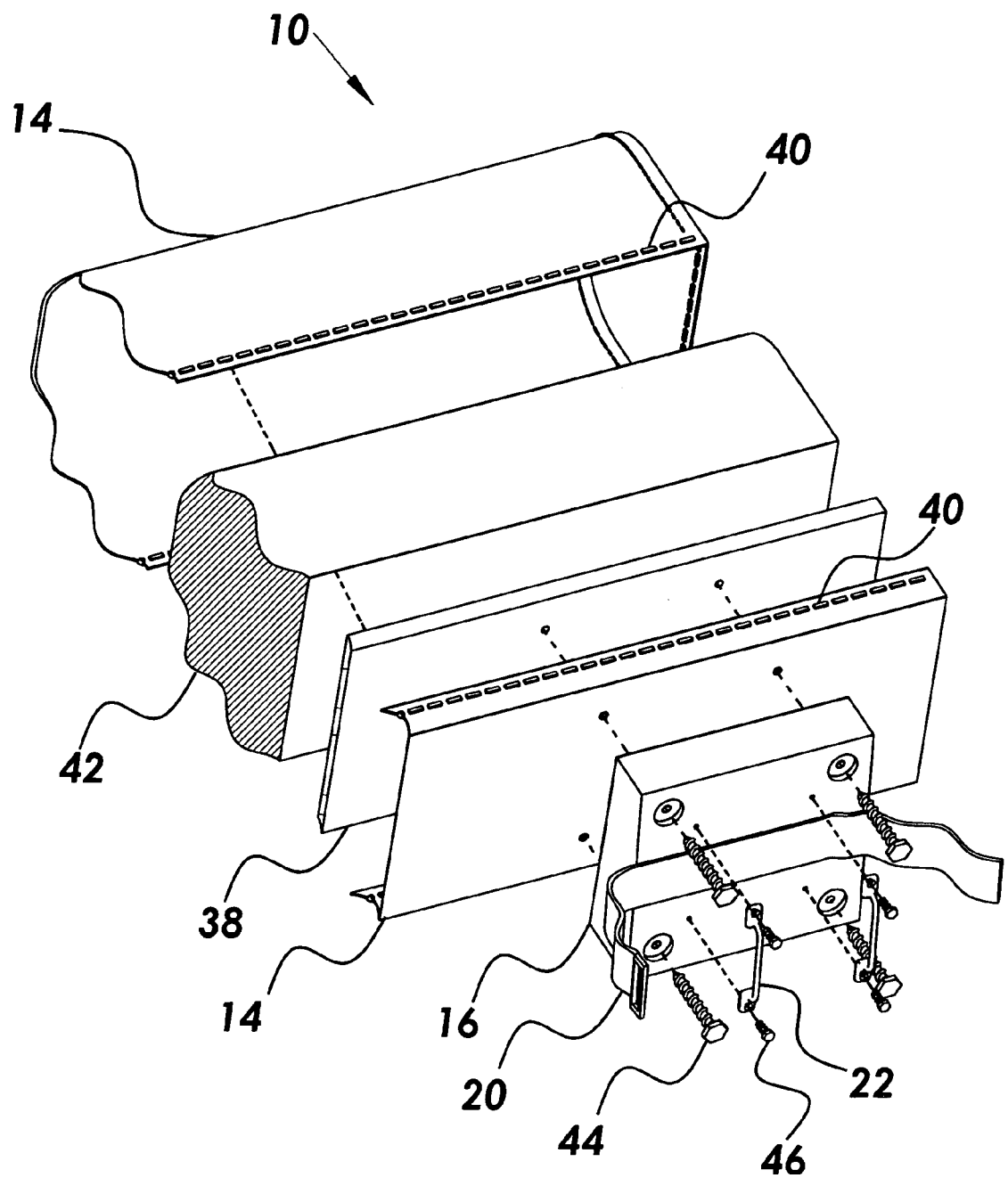
FIG. 4 depicts an exploded cutaway perspective view of the sacroiliac support mechanism invention.

FIG. 4 depicts an exploded cutaway perspective view of the sacroiliac support mechanism 10 invention, where shown are the elements of one embodiment of the invention and their respective relations. As illustrated, the durable soft cover 14 holds the supportive flexible foam material 42 and backing board 38, where the durable soft cover 14 is secured using stitching means 40. In one embodiment of the invention, the durable soft cover 14 is bonded to the supportive flexible foam material 42 using attaching means such as adhesives or plastic welding. In another embodiment of the invention, the supportive flexible foam material 42 is provided having a co-molded surface layer to supplant the durable soft cover 14, where the supportive flexible foam material 42 comprises a density range within high-density foam and low-density foam.

Further depicted are angled mechanism mounting screws 44 for fixedly attaching the angling means 16 to the backing board 38. Attachment loop screws 46 for fixedly attaching the attachment loops 22 to the angling means 16 are depicted to enable the attachment straps 12 to secure the angling means 12 to the seat frame (not shown).

Figure 5:
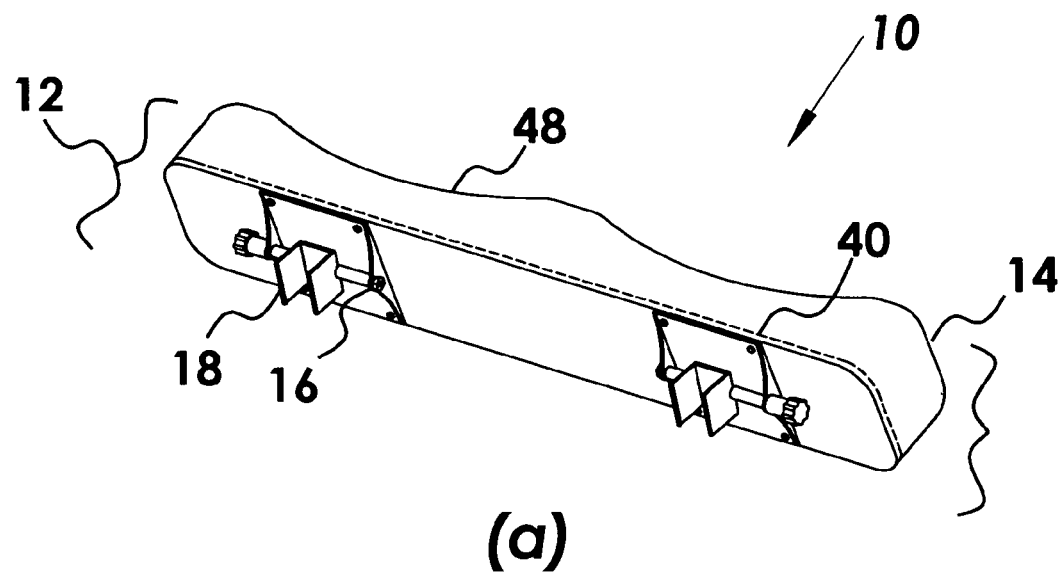
FIGS. 5(a), 5(b), 5(c), depict an alternative embodiment of the current invention having a contoured support cushion and a pivotable angling means.
Figure 5:
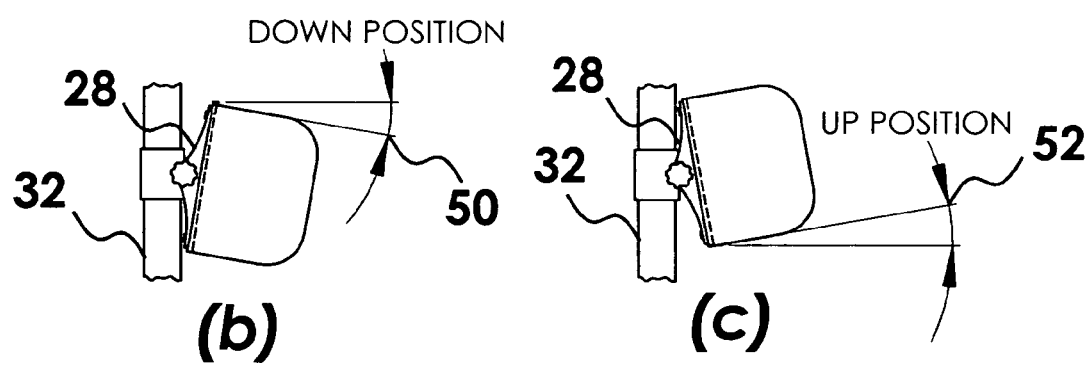

FIG. 5(a) depicts a rear perspective view of an alternate embodiment of the sacroiliac joint support mechanism 10 where the support cushion 12 includes contours 48 for conforming to a golfer's posterior wall region of the sacroiliac joint and hips, and the angling means 16 is pivotable for selecting a desirable angle of support. The angling mechanisms 16 are depicted having a clip-on attachment means 18 for attaching to the seat back frame 32 of the golf vehicle 24.

FIG. 5(b) depicts a side plan view of the alternative embodiment of the sacroiliac joint support mechanism 10 attached to a cutaway view of a golf vehicle seat back frame 32, where the angling means 16 is depicted pivoted to a downward angle of support 50.

FIG. 5(c) depicts a side plan view of the alternative embodiment of the sacroiliac joint support mechanism 10 attached to a cutaway view of a golf vehicle seat back frame 32, where the angling means 16 is depicted pivoted to an upward angle of support 52. The range of adjustment from a horizontal plane in the downward angle of support position 50 is up to thirty degrees, and the range of adjustment from a horizontal plane in the upward angle of support 52 is up to thirty degrees.

Figure 6:
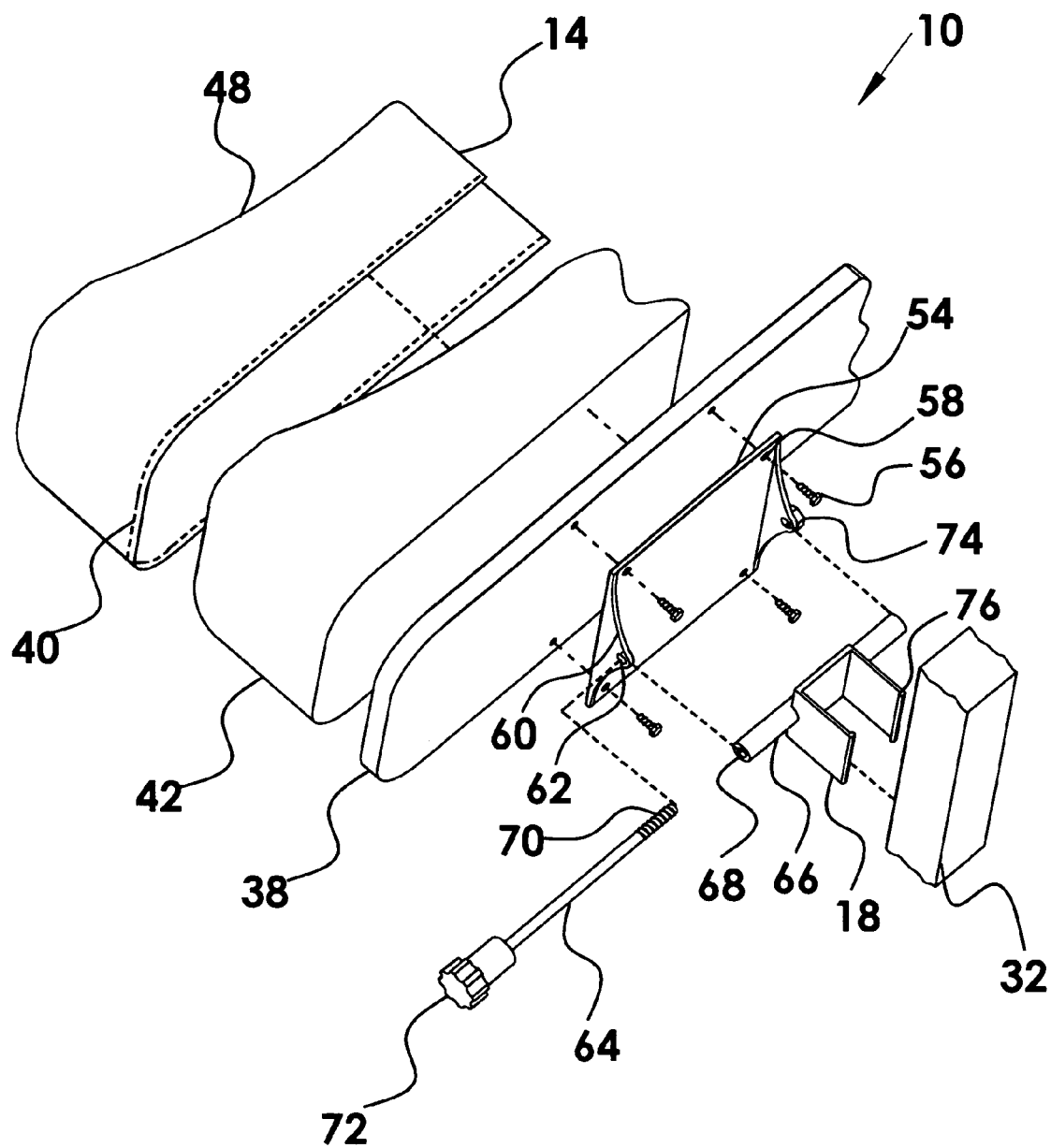
FIG. 6 depicts an exploded perspective rear cutaway view of the alternative embodiment of the sacroiliac joint support mechanism.

FIG. 6 depicts an exploded perspective rear cutaway view of the alternative embodiment of the sacroiliac joint support mechanism 10 of FIGS. 5(a), 5(b) and 5(c), where shown are the elements comprising the alternate embodiment of the current invention. Depicted is the backing board 38, supportive flexible foam material 42 having a desirable contour 48 for fixedly attaching to the backing board 38 and durable soft cover 14 having a desirable contour 48, where the durable soft cover is made from vinyl, plastic, fabric or combination thereof, for attaching to the backing board 38 using a stitching means 40 for holding the supportive flexible foam material 42 and backing board 38.

FIG. 6 further depicts the angling means 16 having pivotable adjustment for the setting the angle of support comprising a base plate 54 for fixedly attaching to the backing board 38 using base plate mounting screws 56 inserted through base plate mounting holes 58 and tightened. Other attaching means such as adhesives, molding or welding may also be used for fixedly attaching the base plate 54 to the backing board 38.

The base plate 54 further comprises a pair of raised hub flanges 60 having hub flange holes 62 for accepting an axle pin 64, wherein the axle pin 64 is for holding an axle 66 to pivots thereabout, and an axle-bearing hole 68 is concentric to and along the length of the axle 66 for receiving the axle pin 64. The axle-bearing hole 68 is aligned collinearly with the hub flange holes 62 where the axle pin 64 is inserted there through, enabling the axle 66 to pivot thereabout.

The axle pin 64 comprises a threaded first end 70 and a turning handle second end 72. The threaded first end 70 is inserted through the aligned collinear holes creating an adjustable angle of support, where the turning handle second end 72 is used to tighten the threaded first end 70 to threaded flange hub nut 74 fixedly attached to a raises hub flange 60 and aligned concentrically along collinear holes. In this embodiment, the turning handle is accessible from the outer ends of the invention.

The attachment means comprises a bracket clip 76 for the invention to the seat back frame 30 using frictionally fitting, clamping means or strong magnets to name a few and is fixedly attached to the axle 66.

In one embodiment of the invention, the cushion height is sized to fit in the open span 30 and frictionally with the seat base 26 and the seat backing 26 while a pair of angling means 16 abuts the seat back frame for positioning the sacroiliac joint support mechanism 10 in the predetermined angle of support, thus eliminate the need for attachment means 18.

FIG. 7(a) depicts an alternate embodiment of the current invention where shown is the sacroiliac joint support mechanism 10 appropriately sized for providing a frictional fit in the open span 30 (not shown) between the seat base 26 (not shown) and the seat back 28 (not shown) eliminating the need for an attachment means. Shown are the angling mechanisms 16 for abutting the seat back frame 30 and projecting the support cushion 12 to a desired angle of support for supporting the posterior wall region of the sacroiliac joint while seated in a seat of a golf vehicle 24.

FIG. 7(b) depicts an alternate embodiment of the current invention where shown is the sacroiliac joint support mechanism 10, sized for providing a frictional fit in the open span 30 (not shown) between the seat base 26 (not shown) and the seat back 28 (not shown) eliminating the need for an attachment means, and comprising accessory therapy compartments 78 created within the support cushion 18 for holding cooling, heating, messaging and vibrating elements (not shown), enabling therapeutic means to the sacroiliac joint while supporting posterior wall region of the sacroiliac joint.

In one embodiment of the current invention, a vibrating massage mechanisms having a frequency up to 3 kHz is inserted to the accessory therapy compartments 78 therein, where as depicted the angling means 16 have accessory power compartments 80 for holding rechargeable battery power supplies (not shown) and are depicted having an exterior power switch 82.

Figure 7:
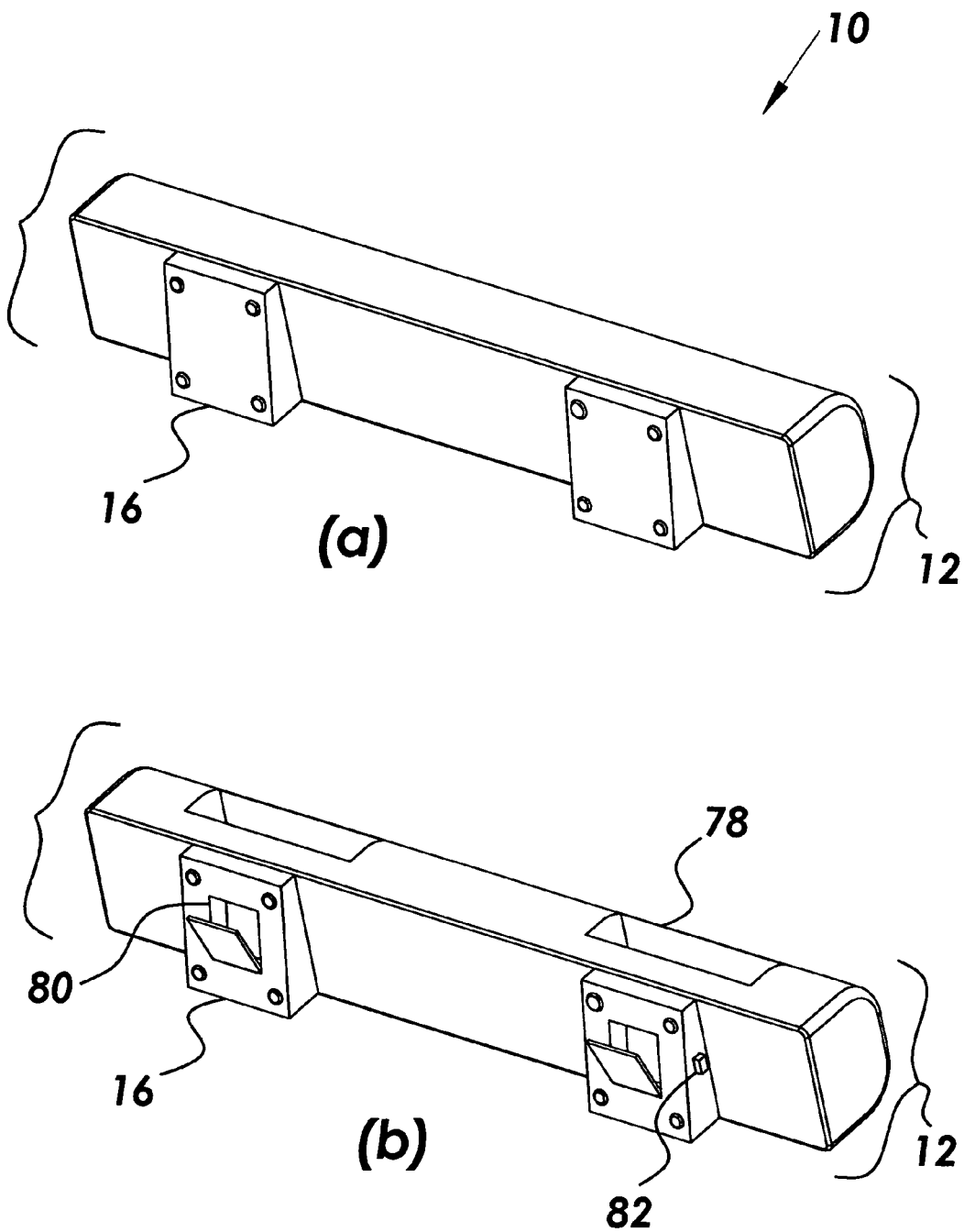
FIG. 7(a) depicts an alternative embodiment of the current invention for inserting to the golf seat open span and desirably sized to frictionally fit between the seat base and seat back.
FIG. 7(b) depicts an alternative embodiment of the current invention having accessory therapy compartments.

In another embodiment of the current invention, heating mechanisms (not shown) for providing heat up to 110 F⁻ to the sacroiliac joint area are inserted to the accessory therapy compartments 78, where, as depicted in FIG. 7(*b*), the angling means 16 have accessory power compartments 80 for holding rechargeable battery power supplies (not shown) and are depicted having an exterior power switch 82.

In another embodiment of the current invention, ice bags (not shown) are inserted to the accessory therapy compartments 80 to provide cooling to the posterior wall region of the sacroiliac joint.

These embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A sacroiliac joint support mechanism having non-adjustable geometry for installing to an open span between a seat bottom and a set back of a golf vehicle comprises a sacroiliac joint supportive cushion for abutting to a posterior wall region of a sacroiliac joint, a backing board sized to fit into the open span, a durable soft cover secured about the sacroiliac joint supportive cushion and the backing board using stitching means, a pair of angling blocks for creating an angle of support and aligning with a seat back frame and attachment means for fixedly abutting the angling blocks to the seat back frame of the golf vehicle.

2. The sacroiliac joint support mechanism of claim 1 wherein the angling blocks are configured for positioning the sacroiliac joint supportive cushion to the angle of support up to thirty degrees from a horizontal plane in the upward or downward direction within the open span between the seat bottom and the seat back of the golf vehicle.

3. The sacroiliac joint support mechanism of claim 1 wherein the angling blocks are fixedly attached to the backing board using screws and positioned symmetrically about a midpoint of a longitudinal length of the backing board.

4. The sacroiliac joint support mechanism of claim 1 wherein the attachment means comprises affixing the angling blocks to the seat back frame of the golf vehicle.

5. The sacroiliac joint support mechanism of claim 1 wherein the attachment means further comprises friction between the sacroiliac joint supportive cushion and the golf vehicle seat back and the golf vehicle seat bottom while the angling blocks abut the seat back frame for creating the angle of support.

6. The sacroiliac joint support mechanism of claim 1 wherein the attachment means further comprises hook and pile straps, cinching straps, or clamps for affixing the angling means to the seat back frame of the golf vehicle.

7. The sacroiliac joint support mechanism of claim 1 wherein the attachment means further comprises attachment loops having attachment loop screws for fixedly attaching the attachment loops to the angling blocks and attachment straps fitted through the attachment loops to secure the angling blocks to the golf vehicle seat frame.

8. The sacroiliac joint support mechanism of claim 7 wherein the attachment straps comprise hook and pile straps, or buckling straps.

9. A sacroiliac joint support mechanism for inserting to an open span between a seat bottom and a seat back of a golf vehicle for supporting sacroiliac joints of golfers riding in golf vehicles comprising a durable soft cover secured about a supportive flexible foam material and a backing board using stitching means, a pair of angling blocks fixedly attached to the backing board using mounting screws, attachment loop screws for fixedly attaching attachment loops to the angling blocks and attachment straps fitted through the attachment loops to secure the angling blocks to a golf vehicle seat back frame.

\* \* \* \* \*